Patented Aug. 23, 1938

2,127,526

UNITED STATES PATENT OFFICE 2,127,526

ACTIVE INSECTICIDE AND FUNGICIDE

Walter C. O'Kane, Durham, N. H.

No Drawing. Application August 16, 1934,
Serial No. 740,197

16 Claims. (Cl. 167—43)

This invention relates to novel types of insecticides and fungicides, and particularly to such materials available for spraying plants.

In the prior art various hydrocarbon oils and distillates, such as petroleum distillates, have been utilized in insecticides and fungicides. But such prior art hydrocarbon products have always represented heterogeneous mixtures of various hydrocarbon molecules, very materially varying in molecular size, so that even with hydrocarbon distillates of restricted boiling point range, such compositions within the boiling point range chosen have represented a mixture of hydrocarbon materials of considerable variation in molecular size.

The presence of widely varying hydrocarbon material insofar as molecular size is concerned, has resulted in molecular aggregates being built up by combination, either chemical or physical, between the smaller molecular materials with the larger molecular substances present. Such aggregations of molecules whether chemical or physical in character materially affect the physical properties of those hydrocarbon materials, and particularly is this true from the standpoint of sprays for use on vegetation. The presence of hydrocarbon materials of widely varying molecular size, or of the aggregates built up from such materials of varying molecular size, undesirably affect properties of such hydrocarbon materials in insecticidal and fungicidal sprays. Thus smaller molecular bodies, which have a tendency to spread more rapidly over plant surfaces, are interfered with by the presence of the larger molecular bodies or aggregates.

In accordance with the present invention, the hydrocarbon materials employed as components of insecticidal or fungicidal sprays are utilized in a condition in which they contain particles of more uniform molecular size, so that molecular interference of larger with smaller particles is thus avoided. And particularly is this true in connection with the use of low boiling hydrocarbon distillates of particles of relatively small molecular size, which are utilized in accordance with the present invention for best results without admixture of other hydrocarbon materials or distillates having materials of molecular size, particularly variant from the hydrocarbon component of the spray material.

Particularly in carrying out the present invention, the utilization of these features of employment of hydrocarbon distillates of substantially uniform molecular size, particularly of small molecular size, is conducted in connection with combinations of which the hydrocarbon component is one element, which combinations exhibit a controlled but only temporary dispersion in water.

By the utilization of such hydrocarbon products of substantially uniform molecular size or what may be referred to as substantially uniform molecularity, the interference of larger with smaller molecules for example in connection with those properties of these sprays, such as spreadability, absorption, or penetration is avoided, whereby substantially desirable and more uniform effects are secured.

These and many other objects and advantages will appear from the more detailed description set forth below in connection with this invention, it being understood that this more detailed description is given by way of illustration and explanation and not by way of limitation, since various changes may be made herein by those skilled in the art without departing from the scope and spirit of the present invention. And while in connection with that more detailed description, theories of operation or activity of these compositions may be given, it should be understood that the present invention is not dependent upon any particular theory of operation or activity, but compositions produced in accordance with the present invention have given phenomenal results in actual use.

Accordingly, in carrying out the present invention, the hydrocarbon component or distillate which is used, is one in which the boiling point range is restricted, and the hydrocarbon component of such limited boiling point range material is further limited to one in which the molecules present are of substantially uniform size. Desirably, and for certain purposes in particular as set forth below, the boiling point range chosen will be to give the low boiling point range materials.

Any desired method may be employed for producing these hydrocarbon materials or distillates of substantially uniform molecularity. For example, a hydrocarbon distillate is produced between any desired boiling point range, usually restricted for example to 244 to 290° F., and such distillate is continuously redistilled until a fraction is obtained relatively uniform as to size of molecules. While in any ordinary single distillation between two given boiling points a fraction is obtained of given molecularity, such fraction is made up of materials varying considerably in the size of molecules. Thus even when the boiling point range is such as to designate the product as a low boiling point fraction, upon a single distillation, there is obtained a fraction which is made up of a considerable number of relatively small molecules with which there are present larger molecules, to which the smaller molecular particles become attached, either through the action of chemical or physical forces, and probably due to the action of molecular surface phenomena. By a continuous over and over process of treatment, substantially uniform molecularity may be obtained in any such fraction, and when a low boiling point fraction is being produced, such continuous treatment will ultimately result in a product having small molecules from which the larger molecules have been eliminated, thus resulting in a fraction consisting primarily of the smaller molecules of substantially uniform size. It is such products of substantially uniform molecularity that are particularly employed in connection with the present invention in sprays for vegetation. Such hydrocarbon products of substantially uniform molecularity may be employed in lieu of hydrocarbon distillates of corresponding boiling point range, in prior art types of fungicides and insecticides. They are particularly valuable components of spray compositions which contain added toxic ingredients, and particularly when the hydrocarbon material is one of relatively low boiling point. Such low boiling point hydrocarbon materials of substantially uniform molecularity present small molecules that are quite active in their spreading and penetrating qualities, so that when they contact with insects present on vegetation, for example, they spread rapidly over the surface of the insects and penetrate rapidly into the tracheal tubes, for example, due to the activity of the small molecules present, and their freedom of interference from larger molecular aggregates. If then, such hydrocarbon products of substantially uniform molecularity are utilized as the carrier for toxic substances, such as plant extracts, including pyrethrins, nicotine, rotenone, etc., due to the rapidity of movement of the small molecules, they facilitate the operation of such toxic substances as the pyrethrins. The hydrocarbon molecules when of low boiling point are mobile and rapidly volatile, thus penetrating the integument of an insect; and on evaporation leaving behind the substantially unvolatile pyrethrins or other toxic substances deposited at a multiple of strategic points where they exert their desired activity.

In using such hydrocarbon products of substantially uniform molecularity, reference is thus being made to products which are free from the molecular interference exhibited by the presence of a wide variety of molecules of different size. And whether or not the uniform action in the present case is secured by means of substantially uniform molecular size, or whether the substantially uniform action which is secured is due to other phenomena, the term "hydrocarbon material or hydrocarbon product of substantially uniform molecularity" is intended to cover products having such characteristics.

Utilizing the hydrocarbon materials of substantially uniform molecularity, usually involves their employment with added components in the production of various types of sprays, and particularly emulsions employed as sprays. In any such utilization, the hydrocarbon product of substantially uniform molecularity should not be utilized in the presence of materials which tend to build up undesirable molecuar aggregates, and thus to interfere with the desired properties of the hydrocarbon materias of substantially uniform molecularity. Consequently in the employment of the hydrocarbon materials and distillates of substantially uniform molecularity, they should be utilized in compositions substantially free from other petroleum fractions, which would interfere with the substantially uniform molecular activity referred to. Thus the low boiling point hydrocarbon distillates of substantially uniform molecularity should not be employed in combinations containing ordinary heavy petroleum oils, such as the so-called white oils commonly used in spraying, due to the tendency of the heavier oil molecules to aggregate themselves with the lower molecules of the petroleum distillates of substantially uniform molecularity, and interfere with the characteristics of such materials as are described above.

While the heavy petroleum oils should, therefore, not be employed with a low boiling or light hydrocarbon distillate of substantially uniform molecularity, the latter may desirably be employed with the glyceride oils, particularly the vegetable and animal oils, since the tendency to aggregation of molecules is not exhibited between the molecules of the glyceride oils and the molecules of the hydrocarbon distillate of substantially uniform molecularity, particularly low boiling distillates of this character. But whatever the explanation of the phenomena involved may be, a markedly greater toxic effect has been found by the utilization, for example, of the low boiling hydrocarbon distillate of substantially uniform molecularity, that is a continuously redistilled fraction of low boiling point range, with the glyceride oils than has been found by such combinations of the low boiling distillates of substantially uniform molecularity with the heavier petroleum oils. Some of the primarily important advantages which follow from the utilization of the low boiling hydrocarbon distillates of substantially uniform molecularity, with vegetable or animal oils, when the hydrocarbon is employed as the carrier for a toxic material like pyrethrum extract are as follows: in the first place, the hydrocarbon distillate of low boiling point range is made up largely of small and active molecules with the pyrethrins or other toxic ingredient in a medium which is able to move rapidly over the surface of an insect and penetrate rapidly into the tracheal tubes, carrying the pyrethrins or other toxic agent with it; while in the second place, the use of a relatively small amount of such extract of pyrethrins or other toxic agent in the hydrocarbon distillate of low boiling point and substantially uniform molecularity, with a relatively larger amount of vegetable oil, which in such cases is a substantially bland oil, corn oil may be specifically mentioned in this connection, results in a diluted extract in a suitable contact medium which prevents the burning of foliage that prior art extracts frequently exhibit, while at the same time that such burning is prevented, the composition retains its rapidity of movement, spreadability, and penetration. Due to the fact that the glyceride oils, particularly vegetable oil, serves simply as a diluent and contact agent without affecting the molecularity of the hydrocarbon distillate, there is no interference with the active performance of the hydrocarbon material, either due to molecular aggregates or otherwise.

Thus a particular phase of the invention resides in the use of a limited amount of a low boiling petroleum derivative with small active molecular constitution, in a larger amount of a bland oil, such as corn oil with which the petroleum derivative is unable to effect molecular linkage, or any other combination either physical or chemical which interferes with the activity and penetration of the material into the integument of the insect. Such combinations are desirably employed as emulsions or dispersions, and more particularly may be utilized in dispersions of temporary but controlled character.

One phase of the present invention is concerned with insecticides and related materials for use in the form of sprays, in which a contact agent, such as an oil, is present in unstable emulsion or dispersion form, so that when sprayed on vegetation such as plants, the dispersion rapidly breaks down, and in fact, in some instances, may have broken down between the time of leaving the spray nozzle and the actual deposition of the material on the plant surface, thus leaving a thin film of oil dispersed over the surface of the plant, carrying the insect poison to all portions thereof, and similarly spreading the oil in thin film rapidly and completely over the surface of an insect which may be present on such plant surface.

A contact agent is employed for carrying toxic material to the insects and plants, which contact agent is desirably made up as a stock material, that is dispersible in water readily to form a comparatively unstable dispersion, which when sprayed upon plants and insects thereon, rapidly breaks down with the deposition of the contact material, not in the form of globules, such as have been obtained through the use of ordinary emulsifying agents in the prior art practice, but the contact agent is deposited in the form of a more or less thin film carrying the insect poison that is spread rapidly and completely over the surface of an insect or plant. The contact agent desirably is an ordinary vegetable or animal oil, that is, a glyceride oil.

Such contact agents are employed as a means for rapidly and completely spreading an insect poison of the surface type. It has been found that insects exhibit a number of sensitive areas widely distributed on the insect's body and its appendages. And as a result of such widely spread sensitive areas on the insect, poisons are utilized which in contact with such sensitive areas of the insect, act as nerve poisons, that rapidly produce death of the insect in a relatively short space of time, due to such surface contact action. These features are particularly emphasized in connection with the present invention, but the invention is not limited thereto, and may be employed in connection with other types of insect poisons including the stomach poisons, and also has application in connection with the utilization of fungicides, etc.

Desirably the spray material employed is in concentrated form, so that it may serve as a stock material that may be readily and rapidly diluted in water in accordance with ordinary spraying practice, to possess the necessary bulk for practical spray operations. The stock material, however, is desirably produced as a substantially nonaqueous or water-free material, whereby it is substantially stable and unaffected by variation in atmospheric temperature, and thus is not susceptible to freezing under any of the conditions which prevail in this country. In producing such stock material, a combination is utilized of such substantially water-insoluble contact agents, such as a vegetable or animal oil, the desired insect poison, and an emulsifying agent. As particularly pointed out below, the insect poison may very desirably be a toxic substance carried in a hydrocarbon distillate, and particularly a low boiling hydrocarbon distillate of substantially uniform molecularity, and as in the case of pyrethrum extracts, the low boiling hydrocarbon distillate may be used as the extraction medium itself for extracting the pyrethrins or active principles from the pyrethrum flowers, and similar utilization may be made of such low boiling point hydrocarbon materials of substantially uniform molecularity in producing extracts from other plant materials.

The insect poisons employed are for most effective purposes chosen from materials that are selectively soluble in the contact agent of the composition. By the term "selectively soluble" as used herein, there is covered such insect poisons which are either insoluble in the water of the final spray material, or at least are essentially carried in the contact material itself, or largely so. When such contact agent, for example, is an oil, desirably the insect poison is selectively soluble in that oil contact agent, as compared with its solubility in water, that is, it is materially higher in its solubility in the contact agent than it is in water. In prior art types of water dispersions and emulsions, the insect poisons, such as nicotin sulphate which was employed, was substantially soluble in water with the result that when the spray is deposited on the plant material, the insect poison being either wholly or largely soluble in the water, has a tendency to leave the contact material, such as the oil in which it may have been originally incorporated, and to move over into the water phase. When this happens, it is immediately deprived of the advantage which the contact or spreading qualities of the contact agents, such as oil, offer. Thus for example, in prior art uses of a spray material consisting of a mineral oil emulsion to which some nicotin sulphate had been added, in the diluted spray material, the nicotin sulphate material is present largely or wholly in the water and is not able to realize its full potentialities, because it is not in permanent and selective solution in the oil. The action of the nicotin sulphate under such circumstances depends on the spreading quality of the water, which is quite inferior.

Accordingly, the present invention utilizes insect poisons, and particularly the nerve poisons that are selectively soluble in the contact materials, such as oil, and remain essentially or largely therein, even in the final spray material, so that the oil which spreads as a thin film over the surface of the insect or plant carries the insect poison, particularly of the nerve poison type, rapidly and completely over the surfaces of the insect and plant, where it exhibits its maximum capability.

The stock material thus produced from the contact agent, such as vegetable or animal oil, and carrying an insect poison desirably selectively soluble therein, is incorporated with an emulsifying agent so that ready dispersion in water may be obtained. Desirably the emulsifying agent is an oil soluble material, or is one which is soluble in the contact material employed. The admixture of such ingredients, including the contact material, the insect poison, and the emulsifying agent, produces stock material, which being substantially free from water is not affected by freezing or other natural temperature variations.

The character of emulsifying agent employed, or the amount of emulsifying agent used, is desirably such that the stock material when added to water is dispersed through it immediately and easily, but does not take on the form of a permanent emulsion, which is too stable. And as noted, one of the important features of the present invention resides in the utilization of a combination which exhibits a controlled but temporary dispersion in water. Thus a final dispersion of the stock material in water produces a spray material, in which the water serves its usual function of diluent and carrier to permit spraying of the diluted stock material, but the suspension of the stock material in water is only temporary, so that within a few minutes after the diluted material is sprayed, or in some cases depending on the rapidity of the break down of the dispersion, between the time that the material leaves the spray gun and its actual deposition on the plant, rapid breaking down of the emulsion or dispersion takes place, and the oil is instantly free to flow completely over the surface carrying the toxic material with it. The oil thus quickly reaches every part of any insect present on the plant material carrying the poison or toxic substance with it, and thereby bringing about the death of the insect in a new and effective way.

As noted, the contact agent is desirably a vegetable or animal oil, among which there may be particularly mentioned corn oil, cottonseed oil, peanut oil, lard oil, fish oil etc.

Among the insect poisons, a wide variety of materials may be included, and particularly exemplifying the nerve poisons, there may be mentioned the extracts of pyrethrum flowers, and other oil-soluble extracts, such as those of derris root, cubé root, tobacco, or oil-soluble nerve poisons, such as the active principle of strychnia, as well as synthetic chemicals including various amine derivatives. A variety of materials may be used, and in the preferred instance, the nerve poison is used which is retained in the oil to exert its toxic action on the sensory structures of an insect when applied to it in solution in such oil.

The emulsifying agents employed are desirably oil-soluble emulsifying agents, particularly when the contact agent is an oil. Such emulsifying agents include sulphonated castor oil, sulphonated vegetable or animal oils in general, triethylamine, potassium oleo-abietate, sodium bisulphide, etc. These materials render the oil or similar contact agent soluble in the water, or temporarily dispersible therein.

The toxic agent, when an insect poison, is frequently employed in the form of an extract of the desired material obtained by utilization of a hydrocarbon distillate. Thus pyrethrum flowers are frequently extracted with a suitable low boiling petroleum fraction to produce the extract of pyrethrins in the low boiling hydrocarbon distillate. In producing such extract, the hydrocarbon material or distillate of substantially uniform molecularity may be employed, so that there is directly obtained the active principle of the plant extract in the low boiling hydrocarbon material of substantially uniform molecularity. However, the pyrethrins or similar material of toxic character may be obtained in any other way and added to the hydrocarbon material of substantially uniform molecularity.

Illustrating a stock material that may be employed in accordance with the present invention, the following is given, the parts being by volume: to 85 parts of corn oil, there is added 13 parts of a toxic agent obtained by extracting pyrethrum flowers with a low boiling hydrocarbon distillate of substantially uniform molecularity. Such low boiling hydrocarbon distillate fraction effectively removes from the pyrethrum flowers, the pyrethrins which are the nerve poisons found in such flowers. This low boiling fraction is in itself soluble in the vegetable oil referred to. To this intimate and complete solution of the toxic extractive in the vegetable oil, there is added 2 parts of a suitable oil-soluble emulsifying agent, such as sulphonated castor oil. The resultant mixture or solution is perfectly stable under all ordinary conditions.

This stock material may then be utilized for dilution with water, and the addition of such a stock solution to water results in immediate dispersion of the stock material in the water. This dispersion prevails for a sufficient length of time to permit spraying. However, the minute droplets lodging on the surface of an insect speedily lose the surrounding film of the emulsifying agent in water, and immediately flow over the surface of the insect and coalesce, thus carrying the nerve poison to a multiple number of sensory structures of the insect. Such a dilution, for example, at the rate of 1 part of the stock material referred to above to 600 parts of water will kill substantially 100% of ordinary plant lice or aphids. Stronger concentrations may be utilized to kill more resistant insects, and the materials of the present invention exhibit a hitherto unattainable margin of safety for application on plants and leaves, since the material although effective against many insects when used at as low a concentration as 1 gallon in 600 gallons of water, on the other hand has shown that it does not harm plants when used at a concentration as great as 30 gallons in 600 gallons of water.

Furthermore, it has been found that the toxic agent, such as the pyrethrins, is much more effective when utilized in connection with the hydrocarbon distillate of low boiling point and substantially uniform molecularity.

The specific example given above is illustrative and not limiting, since the various types of materials exemplified herein may be employed in producing effective insecticidal sprays in accordance with the present invention. The results obtained are new and unobvious. Various tests have demonstrated this to be true, of which the following may be mentioned. A spray material containing vegetable oil alone, but in the same proportions as used for example in the production of the stock material set forth above, and at similar dilution with water, was found to kill only 5% of a certain common species of plant lice or aphids. Similarly, a spray material containing the active principle of pyrethrum flowers in the same amount as that indicated for the exemplary material above, was found to kill only 10 to 15% of the aphids referred to. Further, a spray material containing the oil-soluble emulsifying agent in proportions referred to above for the stock material, and in the indicated dilution, was found not to be toxic to such plant lice or aphids at all. While, therefore, the individual ingredients did not exhibit a satisfactory toxicity to such plant lice or aphids at all, a combination of those materials in the manner indicated for the stock material described above, and diluted 1 to 600 as indicated, developed new and unexpected potency from the action of the ingredients, so that a practically 100% kill of those plant lice was obtained with this material. Other examples of new and unobvious results obtained with the materials of the present invention might be multiplied.

The invention is not limited to the specific ingredients or proportions of materials given, but variations within quite wide limits, both as to proportions and ingredients is possible, so long as the principles set forth above are followed. For example, there may be incorporated in such stock material as that referred to above any one of several substances, which are toxic to fungous growth, and therefore produce a spray material having desirable fungicidal action. Thus, copper zeolite may be incorporated in the stock material. Sulphur in its various forms may be employed. Other suitable forms of copper or sulphur compounds may be employed, and thereby the diluted spray gains the further advantage of fungicidal activity, acting completely and evenly over the surface of leaves or other plant structures, so as to render the fungicide more effective at a given concentration. Fungicides themselves may be employed without necessarily including insecticidal components.

In addition, the compositions may include substances, either in solution or in suspension in the oil or other contact agent, which substances serve as a stomach poison for insects. Thus an extract of derris or of cubé may be added to serve as such stomach poison. Or a finely divided or colloidal arsenic compound may be employed. Similarly a finely divided or colloidal fluorine compound may be added. Such materials being either in solution or in suspension in the oil or other contact material, are so completely and uniformly distributed over the surface of a leaf or other structure, that a leaf-eating insect cannot avoid securing a lethal dose of the poison.

Working with nicotine, it has been found that by use of the principles hereinabove involved, it is possible to get an increase in performance of nicotine comparable with other toxic substances, such as that for the pyrethrins. For example, Black Leaf 40 (nicotine sulphate) is commonly used and recommended at a concentration of 1 part to 800 parts of water for control of common plant lice. Since Black Leaf 40 represents 40% nicotine, the above is equivalent to one part nicotine to 2,000 parts of water. Utilizing the present invention with nicotine as the toxic substance, it has been found possible to get complete control of the same plant lice with a concentration of 1 part of nicotine to 10,000 parts of diluted spray, and undoubtedly such control can be carried up to concentrations of only 1 part to 12,500, or 1 part to 15,000. A specific example of such nicotine composition includes the following, the parts being by volume:

| | Parts |
|---|---|
| Corn oil | 80 |
| Low boiling petroleum derivative | 20 |
| Nicotine (98% pure) | 2 |
| Dispersing agent | 2 |

The above composition is completely safe on plants, even at concentrations of 3, 4 or 5%. At a concentration of ½ of 1% it effects about 100% kill of common plant lice.

As noted, the proportions may vary within considerable limits in connection with the particular examples given above, and other examples employing these materials in accordance with the present invention. Thus the proportion of the low boiling petroleum derivative may vary from 10 to 50% of the complete concentrate. The proportion of toxic agent, such as the pyrethrins or nicotine, for example, may vary between wide limits, depending on the killing strength desired. The proportion of dispersing agent may vary from 1 to 5% of the completed concentrate.

While the low boiling petroleum derivatives have been particularly emphasized for use as extracting agents for the pyrethrins, other extracts may be made, as for example, petroleum ether extract of pyrethrum may be used in place of the low boiling petroleum derivative.

A further example of the utilization of the pyrethrins containing composition and results secured is the following: with a stock concentrated solution containing 80 parts corn oil, 20 parts low boiling petroleum fraction, and 2 parts of the dispersing agent with 3% of pyrethrins added to such stock, the following results were obtained: diluting the stock at the rate of 1 part to 150 parts of water (so that the resulting diluted spray actually contains pyrethrins at the rate of .02%), effective control of the black-head fire worm of cranberries was secured. Ordinary pyrethrum sprays available in the prior art, when used at a concentration of even .032% pyrethrins, failed to give any control of the same insect.

A further important utilization of the present invention involves the utilization of the principles of the present invention with the sulphur-containing compositions. Thus the oil sprays of the present invention involving combinations of the hydrocarbon distillates with glyceride oils can be used safely with sulphur. Comparison of such sprays with prior art sulphur sprays may well be made. No other oil spray on the market can be used safely with sulphur. In fact, the danger of the combination is so great that it results in serious defoliation of plants if the oil spray has been applied within a week or two after sulphur has been used. With the new spray, however, safety is secured. Plants as tender as roses were heavily coated with sulphur and then immediately sprayed with the new spray, using it at the excessive concentration of 2%. No trace of injury resulted. It may be that the corn oil or similar oil being used generally as the larger part of the body of the spray, acts as a preventive or protecting agent in some way. If a petroleum distillate alone were being used, chemical combination with the sulphur would result with resultant plant injury. By having the bland oil present with the petroleum derivative, such bland oil being for example corn oil, a protective action is secured, and no injury results from the combination with sulphur.

The present invention concerned, therefore, with the production of fungicides and insecticides employing materials that yield unstable dispersions in water for spraying purposes, or on the utilization of hydrocarbon materials or petroleum distillates of substantially uniform molecularity as a carrier for a toxic agent, or on a combination of these features, obtains what has long been sought but never adequately achieved in the art, namely a high toxicity against insects or fungi combined with extreme safety on plants, and by the use of new and inexpensive materials.

Having thus set forth my invention, I claim:

1. A fungicide or insecticide composition containing a liquid petroleum hydrocarbon, the hydrocarbon components of which are of substantially uniform molecular size and a glyceride oil.

2. A fungicide or insecticide composition containing a low boiling hydrocarbon distillate of substantially uniform molecular size, and a glyceride oil.

3. A fungicide or insecticide composition containing a liquid petroleum hydrocarbon, the hydrocarbon components of which are of substantially uniform molecular size, a glyceride oil, and a toxic fungicidal or insecticidal component.

4. A fungicide or insecticide composition containing a hydrocarbon distillate of relatively uniform molecular size and low boiling point range, a glyceride oil, and a toxic fungicidal or insecticidal component.

5. A fungicide or insecticide composition containing a liquid petroleum hydrocarbon, the hydrocarbon components of which are of substantially uniform molecular size, a glyceride oil, and a contact insecticide.

6. A fungicide or insecticide composition containing a hydrocarbon distillate of substantially uniform molecular size and of substantially low boiling point, a glyceride oil, and a contact insecticide.

7. A fungicide or insecticide composition containing an insect poison plant extract in a liquid petroleum hydrocarbon, the hydrocarbon components of which are of substantially uniform molecular size, and a glyceride oil.

8. A fungicide or insecticide composition containing an insect poison plant extract in a low boiling hydrocarbon distillate of substantially uniform molecular size, and a glyceride oil.

9. A non-aqueous fungicide or insecticide composition containing a hydrocarbon distillate of substantially uniform molecular size yielding substantial diffusion on plant surfaces, and a glyceride oil.

10. A non-aqueous fungicide or insecticide composition containing a low boiling hydrocarbon distillate of substantially uniform molecular size and a glyceride oil.

11. A substantially non-aqueous fungicide or insecticide composition containing an insect poison plant extract in a liquid petroleum hydrocarbon, the hydrocarbon components of which are of substantially uniform molecular size, and a glyceride oil.

12. A substantially non-aqueous fungicide or insecticide composition containing a low boiling hydrocarbon distillate of substantially uniform molecular size carrying an insect poison plant extract, and a glyceride oil.

13. As an insecticide, a combination of a glyceride oil, an insect poison plant extract in a liquid petroleum hydrocarbon, the hydrocarbon components of which are of substantially uniform molecular size, and an oil-soluble emulsifying agent, in substantially unstable dispersion in water.

14. A fungicide or insecticide composition containing a liquid petroleum hydrocarbon, the hydrocarbon components of which are of substantially uniform molecular size, and a glyceride oil, the hydrocarbon material constituting a minor proportion of the composition.

15. A fungicide or insecticide composition containing a bland oil selected from the class consisting of vegetable and animal oils, an oil soluble insect poison, a hydrocarbon distillate, the hydrocarbon components of which are of substantially uniform molecular size, and an oil soluble emulsifying agent.

16. A fungicide or insecticide composition containing a glyceride oil, an oil soluble insect poison, a hydrocarbon distillate, the hydrocarbon components of which are of substantially uniform molecular size, and an oil soluble emulsifying agent, the constituents being present in proportions to yield an unstable dispersion in water.

WALTER C. O'KANE.